Figure 1:
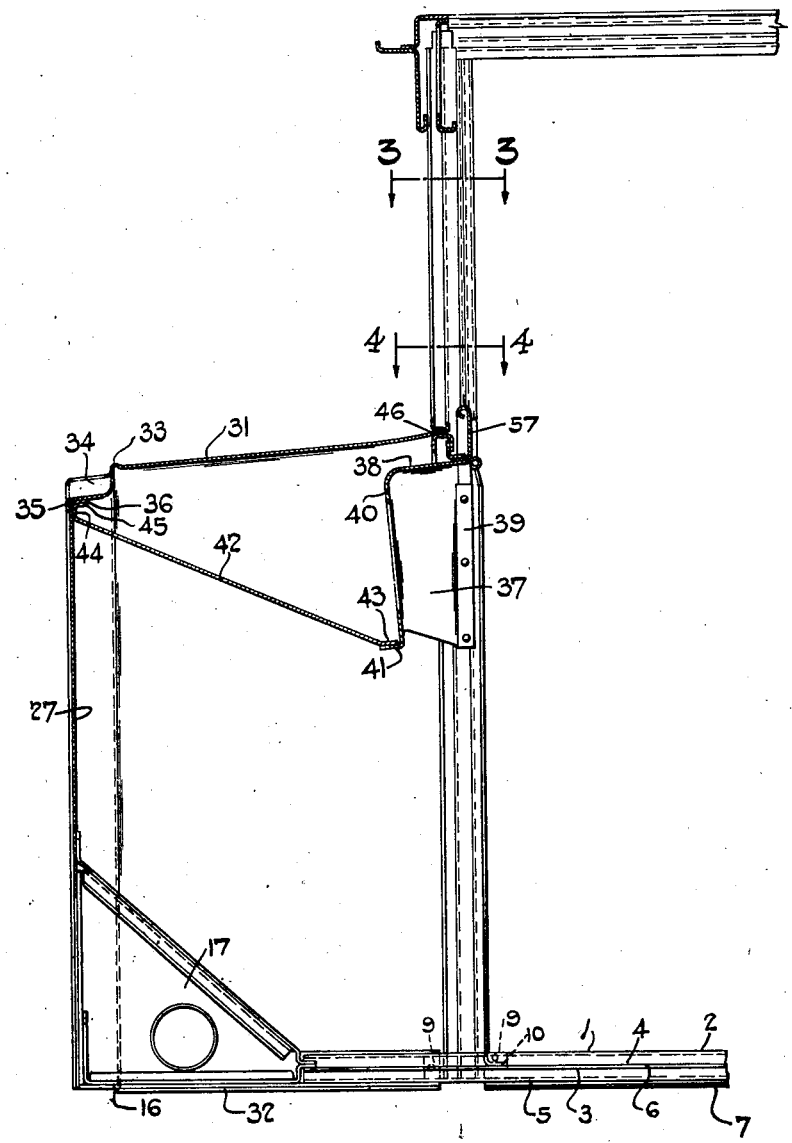

Oct. 6, 1931.   J. LEDWINKA   1,826,427
AUTOMOBILE BODY CONSTRUCTION
Filed April 2, 1927    2 Sheets-Sheet 2
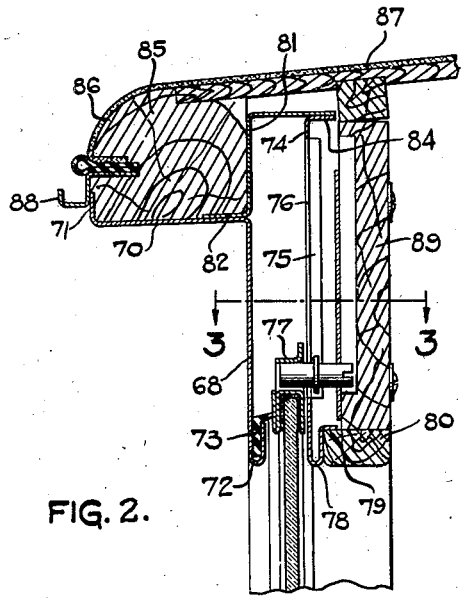
FIG. 2.
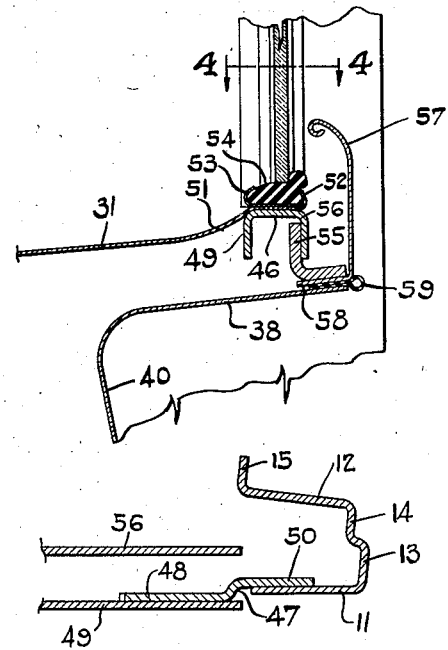
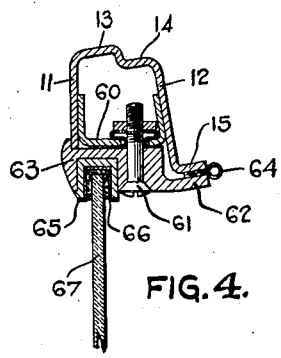
FIG. 4.
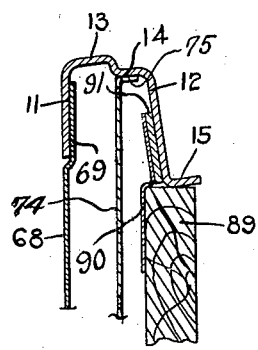
FIG. 3
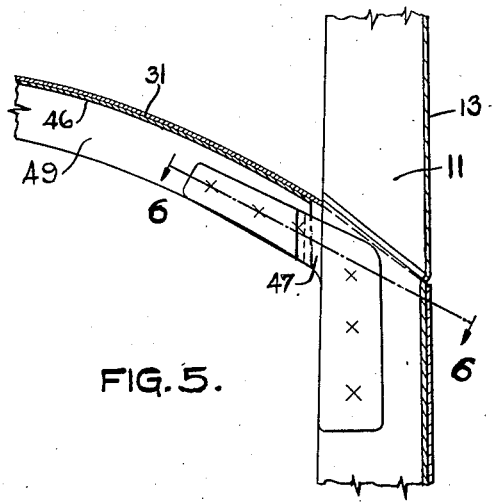
FIG. 5.
FIG. 6.
INVENTOR.
JOSEPH LEDWINKA
BY John P. Tarbox
ATTORNEY.

Patented Oct. 6, 1931

1,826,427

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY CONSTRUCTION

Application filed April 2, 1927. Serial No. 180,445.

This invention relates to automobile bodies constructed of pressed metal; and, more particularly, to a closed automobile body thus constructed, although it should be understood, that it is within its contemplation to utilize features thereof in constructing other types of bodies.

Among the more important considerations confronting automobile body builders is the reduction of the weight of the body and the number of its parts, without sacrificing any of its strength. This reduction of weight and number of parts is governed, by considerations of efficiency and economy in production. The various parts or elements of the body must be capable of being readily formed by quantity production methods, and after formation, of being easily assembled and secured together. Since the preferable manner of securing the members together is by spot welding, in most instances, it is important they be so formed, that access is provided for the welding operation. Further, the various elements or members must be designed with a view to the ultimate cooperative relationship they are to have in the completed body. In other words, each element should, so far as possible, perform a strengthening or bracing function for the other elements of the body, in the end that the assembled elements comprise an integral self sustaining structure. In carrying out these considerations and aims, it is important that the elements present a simplicity of design, both separately and in combination.

The principal object of this invention is to provide a body wherein those aims, above set forth, are accomplished in an efficient, easy and practical manner.

There are other objects and advantages inherent in the invention which will become apparent from time to time as the description thereof progresses.

An embodiment of the invention, in the form of a sedan body, is illustrated in the drawings, it being herewith expressly stated that other embodiments in the form of other types of bodies might also have been used for the illustration.

The figures of the drawings are as follows:

Fig. 1 is a central longitudinal section through the cowl and forward portion of the body, showing the cowl, shroud, instrument board, upper and lower windshield headers, and peak panel in section, and the toe board support, sill, A-post and longitudinal header on one side of the body in elevation, Fig. 2 is an enlarged vertical sectional view through the windshield, the upper and lower windshield headers, and the peak panel, Fig. 3 is a horizontal section taken on line 3—3 of Fig. 2, Fig. 4 is a horizontal section taken on line 4—4 of Fig. 2.

Fig. 5 is an elevational view of a portion of one of the A posts, and a sectional view of a portion of the cowl, Fig. 6 is a sectional view taken on line 6—6 of Fig. 5.

In the drawings and in the specification similar reference numerals will refer to similar parts throughout. In the specification the vertical posts at the front door openings will be called the A posts, those between the front and rear door openings the B—C posts, those at the rear of the rear door opening the D posts, and those at the rear of the rear quarter windows the E posts.

The basic structural elements of the body are the longitudinal side sills 1, which are downwardly presenting channel members extending from approximately midway of the cowl to the post D bracket. These members in the main comprise a base or upper wall 2, outer wall 3, and inner wall 4. The outer wall is of greater depth than the inner wall and both of said walls have horizontally arranged oppositely extending flanges 5 and 6 respectively. The outer flange 5, between the A post and the D post is downwardly and inwardly flanged at 7 to form a finish strip at the door openings.

The A posts 8 are substantially inwardly presenting channel members having their lower ends secured to the sills adjacent the forward ends thereof. This connection is effected by arranging the posts on the outer walls 3 of the sills and forming tabs 9 from the side walls of the posts adapted to be connected to the outer wall 3, and also flanging the lower end of the rear side wall of the post so as to form a horizontally extending tab 10 which is secured to the flange 5 of the sill. As shown in Figures 3 and 4, the substantially inwardly presenting channeled posts have forward walls 11, rearward walls 12, and a base formed of a portion 13 and an inwardly offset part 14. The posts above the lower windshield header have their rearward walls 12 provided along their free edge with a rearwardly extending flange 15.

It has been stated previously that the sills 1 extend forwardly of the A posts, the aproximate point at which they terminate being substantially midway of the cowl. The forward end of each sill is connected to a member adapted to carry a toe board support. This member is substantially triangular in shape in its entirety, with its base 16 inwardly flanged. The base is extended rearwardly. This extension is arranged beneath the sill, see Fig. 13, so that the flange 16 supports the flange 5 thereof while the main portion 17 of the member extends vertically on the outer side of the sill.

The cowl has its paneling 31 inwardly flanged at 32 so as to lie beneath and be secured to the flange 16 of the triangular member, which it has been shown extends substantially to the A-post. Extending around the forward end of the cowl the paneling 31 is provided with a pressed out beading 33 against which the hood may seat. The middle of the forward edge of the upper side of the cowl is depressed at 34 for receiving the hinge means of the hood. The panel 31 is carried forward of the beading 33 and then flanged downwardly and inwardly along its upper edge and its side edges, respectively, as shown at 35. The shroud pan 27 is attached to the cowl within the flanges 35 at its forward end, the periphery of the shroud pan being inwardly flanged at 36, which flange is adapted to be secured to that part of the cowl lying between the beading and the flange 35. The lower part of the shroud pan is cut away from the height at which the toe board support engages the same. Along the edge at this cut away part the shroud pan is inwardly flanged so as to provide a flange, which together with flange 22 forms a complete support for the toe board.

An instrument board panel formed of a single stamping is arranged between the A posts beneath the lower windshield header. The ends 37 and top 38 of this panel are turned rearwardly as shown, the ends 37 being secured to part 14 of the A posts by offset flanges 39, and the rear edge of the top 38 being beneath the lower windshield header. The main portion 40 of the panel is inclined rearwardly slightly, being provided along its lower edge with a forwardly extending flange 41. A bracing member 42 is arranged between the flange 41 of the instrument board panel and the junction of the shroud with the upper forward edge of the cowl. The rear and lower end of the member 42 has a flange 43 extending angularly therefrom and adapted to be secured to the upper surface of the flange 41, while the forward and upper edge thereof is provided with an upwardly extending flange 44 and a rearwardly directed flange 45 adapted to lie in and be secured to the shroud pan in the angle formed by the flange 36.

The lower windshield header 46 is a downwardly presenting channel member arranged between the A posts above the instrument board panel. This channel is secured to the A posts by angle brackets 47, one leg 48 of which is connected to the forward wall 49 thereof, while the other leg 50 is secured to the wall 11 of the A post. The cowl panel 31 adjacent to the header 46 is curved upwardly at 51 and then straightened out so as to lie upon the top of and be secured to the header. The rear edge of the cowl panel is then curved upwardly at 52 to cooperate with another curved member 53 secured to the panel above the header for the purpose of retaining a filler or weatherstripping block 54, preferably formed of rubber. An angle member 55, having one arm thereof secured to the rear wall 56 of the header and the other arm extended rearwardly therefrom, is arranged transversely of the body between the A posts.

A baffle plate member 57 is located to the rear of the header and has its lower end flanged forwardly at 58 so as to underlie and be secured to the angle 55. A weatherstripping or windbreak 59 is arranged between the part 38 of the instrument board panel and the flange 58.

An outwardly presenting channel member 60 is nested within the inwardly presenting channeled A posts between the windshield headers, and its side walls are secured, respectively, to the inner sides of the forward and rearward walls of the A posts. The channel 60 is provided with openings for the reception of fastening means 61 used in securing finishing strips 62 in place. These strips extend across the channel of the posts and have a substantially T head portion 63 at their forward edge, while their rear edge is straight and is spaced from the post by a windbreak 64. The finish strip is also provided with a channel 65 adapted to receive the usual run channel 66 for the windshield 67.

A peak panel extends between the A posts above the windshield opening and comprises a vertical portion 68 the side edges of which are rearwardly offset at 69 to pass behind and be secured to the forward wall 11 of the posts, and a horizontal portion 70 extending forwardly from the top edge of the vertical portion. The front edge of the portion 70 is flanged upwardly at 71, while the lower edge of the vertical portion is rearwardly and upwardly curved at 72 to retain a weatherstrip 73.

Also secured between the A posts at the upper end thereof, and spaced rearwardly from the panel 68 a distance substantially equal to the width of the lower windshield header, is a panel 74. A flange 75 extending rearwardly from this panel forms the attaching means to the post, and a vertical slot 76 therein accommodates the windshield actuating means 77. The lower edge of the panel 74 is rearwardly and upwardly bent at 78, the upper end of this curved portion having a rearwardly directed flange 79 resting upon a wooden cross member 80.

A substantially Z shaped member 81 extends transversely of the body at the front thereof, the lower horizontal arm 82 of which rests upon and is secured to the part 70 of the peak panel, while the upper horizontal arm 83 is secured to the top of the flange 84 extending rearwardly from the top edge of the panel 74.

Fitted within the upwardly presenting channel formed by the peak panel and member 81 and the panel 74 is a wooden peak member 85 transversely coextensive with the peak panel. The forward and upper edge of this wooden member is curved at 86 to provide the usual curved visor continuation of the roof and is also provided with a recess adapted to house an inturned portion of the roof covering 87, a weatherstripping, and a securing flange of the drip molding 88.

Across the rear of that portion of the structure just described, is a wooden panel 89. Attaching strips 90 are secured to the forward side of the panel 89 and to spacing members 91 secured to the inside of the rear wall 12 of the posts. The members 90 are rearwardly offset intermediate their ends, which offsets together with the thickness of the spacing members 91 compensates for the angular relationship between the panel 89 and the rear wall 12 of the post.

The foregoing description has clearly illustrated the manner in which the objects of the invention are obtained by forming the body of a relatively few number of parts, each of which cooperates with the others to strengthen the whole and in such a way as to permit of their ready assembly.

Various modifications and adaptations of the invention within the scope of the appended claims may be made.

I claim:

1. In an automobile body construction, inwardly presenting channel members forming posts and having their forward side walls of substantially less depth than their rear side walls, and members secured across the openings of said channel members having grooves formed therein adapted to house glass run channels, the front side wall and groove of a post being of an aggregate depth not substantially greater than the rear side wall of the post.

2. In an automobile body construction, an inwardly presenting channel member forming a post having its forward side wall of substantially less depth than its rear side wall, a member detachably secured across the opening of said channel having a flange overlapping the post and a groove extending the length of the member, and a glass run channel arranged in said groove with its inner portion substantially flush with the mouth of said groove, the aggregate depth of the groove and the forward side wall of the post being not substantially greater than the depth of rear side wall of the post.

3. In an automobile body construction, front posts, a transversely extending peak panel secured to said posts adjacent their upper ends having a vertically extending arm and a substantially horizontally extending arm, a Z shaped member extending between the front posts and secured to the horizontal arm of the peak panel adjacent its junction with the vertical arm thereof and having its web portion extend the said vertical arm of the peak panel upwardly, and a member secured to said Z shaped member and extending vertically downward in spaced relation to said vertical arm of the peak panel, whereby a windshield may be accommodated therebetween.

4. In an automobile body construction, front posts, a peak panel secured therebetween and having vertically and horizontally extending arms, the horizontal arm extending forwardly of the posts, an angular member having vertical and horizontal arms secured to the peak panel to extend the vertical arm of the peak panel upwardly above the horizontal arm thereof, said horizontal arm of the angular member extending rearwardly at the top of the vertical arm, and a rear vertical panel connected to said last-named horizontal arm in spaced relation to the vertical arm of the peak panel to provide a space for receiving a vertically movable windshield.

In testimony whereof he hereunto affixes his signature.

JOSEPH LEDWINKA.